(12) United States Patent
Heyenk et al.

(10) Patent No.: US 6,413,648 B1
(45) Date of Patent: Jul. 2, 2002

(54) CAN AND COIL COATING RESINS

(75) Inventors: Albert Heyenk, Brummen; Johannes Wilhelmus Besamusca, Zwolle, both of (NL)

(73) Assignee: DSM NV, Heerlen (NL)

( * ) Notice: Subject to any disclaimer, the term of this patent is extended or adjusted under 35 U.S.C. 154(b) by 0 days.

(21) Appl. No.: 09/419,926

(22) Filed: Oct. 18, 1999

Related U.S. Application Data

(63) Continuation of application No. PCT/NL98/00193, filed on Apr. 6, 1998, now abandoned.

(30) Foreign Application Priority Data

Apr. 18, 1997 (NL) ............................................. 1005841

(51) Int. Cl.⁷ ............................................. C09D 167/02

(52) U.S. Cl. ........................ 428/482; 428/413; 428/418; 525/438; 525/440; 525/443; 525/444

(58) Field of Search ................................. 525/444, 438, 525/440, 443; 428/482, 413, 418

(56) References Cited

U.S. PATENT DOCUMENTS

| 4,734,467 A | | 3/1988 | Yamada et al. |
| 5,411,810 A | * | 5/1995 | Hirakouchi .................. 428/480 |
| 5,739,215 A | | 4/1998 | Westerhof et al. |

FOREIGN PATENT DOCUMENTS

| EP | 0 257 144 | 3/1988 |
| EP | 0 669 382 A1 | 8/1995 |
| EP | 0 686 678 a1 | 12/1995 |
| JP | 09-194792 A | 7/1997 |
| WO | 95/01407 | 1/1995 |

* cited by examiner

*Primary Examiner*—Patricia A. Short
(74) *Attorney, Agent, or Firm*—Pillsbury Winthrop LLP

(57) ABSTRACT

The invention relates to a can or coil coating resin system. The system contains a mixture of at least 2 polymers wherein at least one polymer has a glass transition temperature greater than 45° C. and wherein the polymers are soluble in organic solvents. The polymer with the glass transition temperature of greater than 45° C. is preferably an amorphous polyester resin. The second polymer may be a resin with a dry solids content between 30% and 100% and a Tg of less than 40° C.

8 Claims, No Drawings

CAN AND COIL COATING RESINS

This is a Continuation of: International application No. PCT/NL98/00193 filed Apr. 6, 1998, now abandoned.

The invention relates to resins which can be used in can and coil coating compositions.

As is evident from the articles 'Pulver-Bandbeschichten bei 60 m/min' by Dr Graziano (JOT 1996/8, pp. 34–39) and 'Polyester based Powder Coatings with reference to Coil Coating' by P. Binda (ECCA, Autumn Congress, Brussels, Nov. 18–19, 1996), there is a need for powder paint systems that can be used in coil coating processes at application rates of, for example, 120 m/min. The reactivity of a powder paint composition is too slow for achieving such high rates. The powder paint application techniques (spraying) are also too slow in comparison with the roll application techniques used in can and coil coating processes. Another drawback is that powder paint layers are applied as relatively thick layers. Powder paint resins do moreover generally not comply with foodstuffs legislation. Furthermore, the solid resins having a high glass transition temperature (Tg) used in powder paint compositions are not soluble in organic solvents as used in the coil coating industry.

It is the object of the invention to provide a resin system that can be processed with the aid of the application techniques currently used on an industrial scale in the coil coating industry.

The resin system according to the invention is characterised in that the system comprises a mixture of at least two polymers wherein at least one polymer has a glass transition temperature greater than about 45° C. and wherein the polymers are soluble in organic solvents.

Suitable polymers include for example polyesters and polyacrylates.

Preferably the polymers are polyesters.

Preferably, the glass transition temperatures (Tg) of the polymers are different. This difference is generally greater than 5° C.

The molecular weights ($M_n$) of the polymers are usually between about 2000 and about 15000 and preferably they range between about 3000 and about 8000.

Preferably, the resin having a Tg greater than 45° C. is amorphous.

Examples of suitable organic solvents which are used for can and coil coating applications include aromatic hydrocarbon resins (for example the 'Solvesso' types), N-methylpyrolidone, xylene, propylene glycol monomethylether, methylpropylene glycol acetate, dibasic ester, isophoron, ethyl ethoxypropionate, ethylene-propylene glycol acetate and/or butyl glycol.

Generally, the second polymer has a dry solids content between about 30% and about 100%. The Tg of the second polymer is generally lower than about 40° C.

However it is also possible to apply a second polymer having a Tg higher than about 40° C.

Preferably, the second polymer has a dry solids content of at least 50% and a Tg of less than 10° C.

The resins may be linear or branched.

The resin system according to the invention can be applied with the present application techniques in can and coil coating processing, because the solid high Tg resins dissolve during the preparation of the paint or varnish and can be applied as solvent borne coating paints. The use of these systems implies also low transport costs and less storage volume before the preparation of the paint.

Coatings with specifically desired properties in the wide application range of both can coatings and coil coatings can be obtained by selecting the appropriate choice of the starting resins in the mixture.

To replace a very wide range of different prior art solvent-bearing resins it is only necessary to make a selection from only a few systems according to the invention because the coating properties can be adjusted by changing the mixing ratio between the resins in the mixture.

Another advantage is the possibility of a flexible choice of solvents because the high Tg resins are soluble in a wide range of solvents.

The weight proportion of the polymer having a Tg higher than 45° C. is generally at least 25% and preferably at least 50% (relative to the polymers).

Preferably, the resin system is amorphous because of the desired solubility characteristics.

The polymers are soluble in the organic solvents so that they remain homogeneous and that they show no crystallisation for a period of at least 7 days.

Depending on the desired use, the acid numbers of the polyesters range between about 0 and about 100 mg of KOH/gram of resin and the hydroxyl numbers of the polyesters range between 0 and about 150 mg of KOH/gram of resin.

Systems according to the invention can be used in existing coil coating application lines at rates of up to, for example, 150 m/min and dry layer thicknesses between, for example, 1 and 60 µm.

The polymer mixture according to the invention has to be cured with a crosslinker.

Examples of suitable crosslinkers include compounds containing epoxy groups, compounds containing amino groups and compounds containing isocyanate groups. The crosslinker can be selected depending on the desired use.

Examples of suitable compounds containing epoxy groups are bisphenol A epoxy resins (for example Epikote 828™, Epikote 1001™ and Epikote 1004™ from Shell), hydrogenated bisphenol A epoxy compounds, aliphatic epoxy compounds, epoxidised alkyd resins, epoxidised oils (for example epoxidised linseed oil or soybean oil), epoxidised borates and triglycidyl isocyanurate. Preferably a bisphenol A epoxy resin is used as an epoxy group containing crosslinker.

The carboxyl:epoxy equivalent ratio is generally between 0.85:1 and 1:0.85, preferably between 0.9:1 and 1:0.9.

Examples of suitable amino resin crosslinkers are benzoguanamine, melamine and urea-formaldehyde resins. The polyester:amino resin weight ratio is generally between 95:5 and 60:40 (based on solid resin).

Examples of suitable crosslinkers containing (blocked) isocyanate groups are hexamethylene diisocyanate (HDI), toluene diisocyanate (TDI), isophoron diisocyanate (IPDI), tetramethylxylene diisoycanate (TMXDI), 3,4 isocyanatomethyl-1methyl-cyclohexylisocyanate (IMCI) and their dimers and trimers. Preferably these crosslinkers are blocked.

It is possible to combine the polymers with the same crosslinker. If desired, it is also possible to apply different crosslinkers or mixtures of crosslinkers.

The resins may contain a solid catalyst fused in it. It is also possible to mix a liquid catalyst or a catalyst solution into the paint formulation comprising the resin mixture.

Suitable catalysts for acid-epoxy curing are described by Madec et al. in 'Kinetics and Mechanisms of Polyesterifications', Advances in Polymer Science, 182–198 (1985). Examples of suitable classes include N-dialkylamine pyridines, tertiary amines, imidazoles, guanidines, cyclic amines and latent amine catalysts. The catalysts can be blocked if so desired.

Examples of suitable catalysts for curing an OH-functional polyester and an amino resin as a crosslinker include strong acids such as sulphonic acids, mono and dialkyl acid phosphate, butyl phosphate and butyl maleate.

Suitable sulphonic acids include for example paratoluene sulphonic acid, methane sulphonic acid, nonyl benzene sulphonic acid, dinonyl naphthalene disulphonic acid and dodecyl sulphonic acid.

Suitable catalysts for curing an OH-functional polyester and an isocyanate based crosslinker include, for example, dibutyl tin dilaureate and zinc octoate.

If catalysts are present, they are generally present in amounts of between about 0.1 and about 5 wt. % (relative to the polyester).

Suitable polyalcohols for preparing the polyesters include ethylene glycol, diethylene glycol, butanediol (1,4), hexanediol (1,6), neopentyl glycol, 2-methyl-1,3-propanediol, 1,3-butanediol, 1,3-propanediol, 1,2-propanediol, 2-ethyl-2-butyl-1,3-propanediol, trimethylpentanediol, hydroxypivalic neopentyl glycol ester, tricyclodecane dimethanol, cyclohexane dimethanol, bisphenol A bishydroxyethyl ether, trimethylolpropane and/or pentaerythritol.

Suitable examples of acids for preparing the polyesters include isophthalic acid, terephthalic acid (dimethyl terephthalate ester), adipic acid, sebacic acid, hexahydroterephthalic acid (CHDA), decane dicarboxylic acid, 5-6-butylisophthalic acid and/or dimerised fatty acids or acid anhydrides such as phthalic anhydride, tetrahydrophthalic anhydride, succinic anhydride, maleic anhydride, trimellitic anhydride, pyromellitic anhydride and/or hexahydrophthalic anhydride.

Preferably phthalic anhydride, isophthalic acid, terephthalic acid and/or adipic acid are used.

The esterification reaction preferably takes place under a nitrogen atmosphere at temperatures between 180° C. and 260° C. Catalysts such as dibutyl tin oxide, tin chloride, butyl chlorotin dihydroxide (FASCAT™) or tetrabutyoxytitanate and antioxidants such as phosphorous acid, trinonylphenylphosphite or triphenylphosphite can be added as additives. During the reaction the reaction water released is removed through distillation and the desired degree of esterification can be achieved by applying azeotropic distillation and/or vacuum in the last phase.

The reaction results in a polyester that can be dissolved in an amount of organic solvent or in a mixture of organic solvents such that the desired solids content is obtained. The solvent can be added immediately after the polyester synthesis. The solvent is preferably added during the paint preparation.

Suitable solvents include, for example, aromatic hydrocarbon resins (for example Solvesso types), N-methylpyrolidone, xylene, propylene glycol monomethylether, methylpropylene glycol acetate, dibasic ester, isophoron, ethylethoxypropionate, ethylene-propylene glycol acetate and/or butyl glycol. Preferably aromatic hydrocarbons and/or butyl glycol are used.

Coil coatings can be obtained via commonly known processes as described for example in 'Coil Coatings' by Joseph E. Gaske (Federation of Societies for Coatings Technology, February 1987, pp. 7–19).

The curing conditions and additives can be chosen to depend on the desired peak metal temperature (PMT) and the nature and thickness of the substrate. The curing time will generally be between about 20 and about 70 seconds at temperatures between about 250° C. and about 400° C. and a PMT between 204° C. and 249° C.

Suitable substrates include for example steel, tin-plated steel and aluminium.

The coil coatings according to the invention are suitable for use as primer and as top coat and can for example be used as coating for household equipment such as fridges, deepfreezes, microwave ovens, ovens and boilers, as coating for caravans and as coating for facade cladding.

The resin composition according to the invention also yields good results in the can coating industry with which the desired layer thickness generally is thinner and with which the curing conditions differ from the conditions in the preparation of coil coatings.

Can coatings can be obtained via processes of the kind described in for example 'Organic Coatings—Science and Technology, Volume 2: Applications, Properties and Performance' by Z. W. Wicks et al. (Wiley-Interscience, 1994, pp. 284–290).

The curing conditions and additives can be selected to depend on the desired application and the nature and thickness of the substrate. The curing time will generally lie between a few seconds and tens of minutes at temperatures between about 100° C. and about 220° C.

Suitable substrates include for example steel, tin-plated steel (ETP, Electrolytic Tin Plate), chromium-plated steel (ECCS, Electrolytic Chromium-Chromium oxide Steel) and aluminium.

The coatings according to the invention are suitable for use as interior and exterior coatings and can be used for example as coatings for beer cans, cans for other beverages ('2 and 3 piece'), spray cans, can ends, tubes, drums, cigar boxes and fish cans (the so-called 'drawn-redrawn (DRD)', 'draw-wall ironed (DWI)' cans). They can be used in pigmented or in unpigmented compositions.

The use of the exterior coating is important primarily from a decorative viewpoint, for giving the substrate a saleable appearance. It protects the metal from corrosion and the coating also serves as a label.

The interior coating is mainly intended on the one hand to protect the contents of the can against the influences of the metal and on the other to protect the metal against the contents of the can.

The type of monomers to be used to prepare the polyester, the crosslinkers and the curing conditions can be chosen to depend on the desired use.

The systems according to the invention can be used in pigmented an in unpigmented compositions.

If so desired, the usual additives such as pigments, fillers, stabilisers, dispersing agents, flow-promoting agents and defoaming agents can be added to the binder system according to the invention.

The invention will be elucidated with reference to the following, non-limiting examples.

EXPERIMENT I

Preparation of a Solid Polyester Resin 294 parts by weight of ethylene glycol, 510 parts by weight of neopentyl glycol, 409 parts by weight of phthalic anhydride, 458 parts by weight of isophthalic acid, 611 parts by weight of terephthalic acid, 1 part by weight of dibutyl tin oxide and 2 parts by weight of trinonylphenylphosphite were heated under a nitrogen atmosphere in a glass reaction flask with a mechanical stirrer, a thermometer and a still with a Vigreux column. The esterification reaction started at 188° C. and the reaction water formed was removed through distillation. The maximum reaction temperature was 245° C. After one hour at 245° C. this was changed to vacuum distillation until an acid number of 3.5 mg of KOH/gram was reached.

The acid number of the solid resin obtained was 3.5 mg of KOH/gram and the hydroxyl number was 18.5 mg of KOH/gram.

The viscosity (measured via Emila at 158° C.) was 260 dpa.s.

The number average molecular weight (Mn) was 5080 gram/mol, determined with the aid of gel permeation chromatography using a polystyrene standard.

The polyester's glass transition temperature was 50° C. (determined with a Mettler TA 3000 DSC (5° C./min.))

EXPERIMENT II

Preparation of a High Solid Polyester Resin 301 parts by weight of ethylene glycol, 551 parts by weight of neopentyl glycol, 576 parts by weight of phthalic anhydride, 852 parts by weight of adipic acid and 2 parts by weight of phosphorous acid were heated under a nitrogen atmosphere in a glass reaction flask with a mechanical stirrer, a thermometer and a still with a Vigreux column. The esterification reaction started at 157° C. and the reaction water formed was removed through distillation. The maximum reaction temperature was 235° C. After one hour at 235° C. this was changed to azeotropic distillation using xylene until an acid number of 5 mg of KOH/gram was reached. This was followed by vacuum distillation until an acid number of 2 mg of KOH/gram was reached. After cooling to 170° C., 857 parts by weight of Solvesso 150™ were added to obtain a 70% dry solids content. The dry solids content is determined by equable applying 0,2 grammes polymer solution on aluminiumfoil (15×20 cm). Next the foil with resin solution is dried during 15 min. in an oven at 150° C. The difference in weight before and after drying indicates the percentage of dry solids content.

The acid number of the solid resin was 2 mg of KOH/gram and the hydroxyl number was 20 mg of KOH/gram.

The viscosity measured in a Physica Viscolab LC3 at 23° C. was 73 dPa.s.

The molecular weight (Mn) was 4920 gram/mol, (determined with the aid of gel permeation chromatography using a polystyrene standard).

The glass transition temperature of the polyester was −15° C., (determined with a Mettler TA 3000 DSC; 5 C./min.).

EXPERIMENT III

Preparation of a Solid Polyester Resin 787 parts by weight of 1,2-propylene glycol, 127 parts by weight of trimethylolpropane, 155 parts by weight of adipic acid, 1092 parts by weight of isophthalic acid, 465 parts by weight of terephthalic acid, 1.1 parts by weight of dibutyl tin oxide and 1.1 parts by weight of trinonylphenylphosphite were heated under a nitrogen atmosphere in a glass reaction flask with a mechanical stirrer, a thermometer and a still with a Vigreux column. The esterification reaction started at 177° C. and the reaction water formed was removed through distillation. The maximum reaction temperature was 230° C. After one hour at 230° C. this was changed to azeotropic distillation using Solvesso 150™. At an acid number of 6.4 mg of KOH/gram vacuum distillation was applied until an acid number of 5.3 mg of KOH/gram was reached.

The acid number of the solid resin was 5.3 mg of KOH/gram.

The glass transition temperature of the polyester was 49° C. (determined with a Mettler TA 3000 DSC (5° C./min)).

The molecular weight (Mn) was 5410.

EXPERIMENT IV

Preparation of a High Solid Polyester Resin 124 parts by weight of ethylene glycol, 468 parts by weight of neopentyl glycol, 213 parts by is weight of diethylene glycol, 131 parts by weight of trimethylolpropane, 689 parts by weight of adipic acid, 695 parts by weight of isophthalic acid, 1 part by weight of dibutyl tin oxide and 2 parts by weight of trinonylphenylphosphite were heated under a nitrogen atmosphere in a glass reaction flask with a mechanical stirrer, a thermometer and a still with a Vigreux column. The esterification reaction started at 165° C. and the reaction water formed was removed through distillation. The maximum reaction temperature was 230° C. After one hour at 230° C. this was changed to azeotropic distillation using Solvesso 150™ until an acid number of 0.8 mg of KOH/gram was reached. After cooling to 170° C. 857 parts by weight of Solvesso 150™ were added to obtain a 70% solids content.

The acid number of the solid resin was 0.8 mg of KOH/gram.

The viscosity, measured with the aid of a Physica Viscolab LC3 at 23° C., was 49 dPa.s.

The glass transition temperature of the polyester was −14° C. (determined with a Mettler TA 3000 DSC (5° C./min.)).

The molecular weight (Mn) was 4590.

EXPERIMENT V

Preparation of a Solid Polyester Resin 546 parts by weight of neopentyl glycol, 106 parts by weight of ethylene glycol, 50 parts by weight of 1,6-hexane diol, 123 parts by weight of 1,4-cyclohexanedimethylol, 65 parts by weight of 1,2-propylene glycol, 1271 parts by weight of isophthalic acid, 146 parts by weight of 1,4-cyclohexanedicarboxylic acid, 1 part by weight of butyl chloroindihydroxide (Fascat 4101™) and 2 parts by weight of trinonylphenylphosphite were heated under a nitrogen atmosphere in a glass reaction flask with a mechanical stirrer, a thermometer and a still with a Vigreux column. The esterification reaction started at 183° C. and the reaction water formed was removed through distillation. The maximum reaction temperature was 230° C. After one hour at 230° C. this was changed to vacuum distillation until an acid number of 2.4 mg of KOH/gram was reached.

The acid number of the resin was 2.4 mg of KOH/gram and the hydroxyl value was 25 mg of KOH/gram.

The glass transition temperature was 45° C. (determined with the aid of a Mettler TA 3000 DSC (5° C./min.)).

The molecular weight (Mn) was 4560.

EXAMPLE I

Paint Composition

The polyester according to Experiment I was dissolved in a mixture containing Solvesso 150™, dibasic ester and butyl glycol in a weight ratio of 3:6:1 until a solids content of 50% was obtained. The viscosity was 17 dpa.s (measured at 23°

C. using a Physica Viscolab LC3). After 3 months at room temperature the resin was still completely dissolved.

To 13.3 parts by weight of the polyester resin thus obtained were added 2.1 parts by weight of anticorrosive pigment (Halox CW491™), 2.1 parts by weight of anticorrosive pigment (Zinkfosfaat ZP/M™), 4.1 parts by weight of an antisettling agent (10% Bentone SD2 in Solvesso 150™), 6.4 parts of titanium dioxide (Kronos 2160™), 10.4 parts by weight of a thinner (Solvesso 150™/butyl glycol 3:1), 0.2 parts by weight of antifoaming/flow-promoting agent (50% Disparlon L1984™ in Solvesso 150™) and 5.0 parts by weight of an extender (Blancfixe Micro). This mixture was then ground to a pigment paste. During the preparation the paste's temperature did not rise above 70° C.

After cooling to room temperature, 7.5 parts of the 50% solution of the resin described above, 2.7 parts of polyester according to Experiment II, 2.8 parts of a crosslinker containing amino groups (Cymel 325™), 0.4 parts of catalyst (Nacure 4167™) and 1.2 parts of crosslinker (Epikote 828™) were subsequently added. The mixture was then diluted using a mixture of Solvesso 150™ and butyl glycol in a 3:1 weight ratio until a viscosity of 40–50 seconds' flow time, DIN cup 4, at 23° C. (DIN standard 53 211), was reached.

In the following examples the characteristics are determined as follows:
1) The solvent resistance test is done by counting the number of dubble rubs (forwards and back) necessary to remove the coating down to the metal. Rubbing is carried out with a piece of cotton wool-soaked in a solvent (methyl ethyl ketone). The result is reported as a number of dubble rubs from 0–100 (numbers above 100 are all reported as >100).
2) gloss: ASTM-D-523
3) layer thickness: ISO 2360
4) adhesion: DIN53151
5) appearance: visually
6) flow: visually
7) T-bend flexibility: ASTM-D-4145
8) The wedge bend test is conducted to determine the flexibility. A cooled panel (100 mm by 40 mm) is bent over a 6 mm cylindrical mandrel. The folded panel thus produced is then impacted (4,5 Nm) in a device (the wedgebend tester) to form a wedge-shaped contour, flat at one end and 6 mm diameter at the other end. This test piece is then immersed in acidified 3% hydrochloric acid saturated copper sulphate solution for 4 minutes in order to stain any cracks in the coating. The distance in millimeters, which is crackfree is measured. The percentage crackfree is recorded. The higher the % crackfree, the higher the flexibility.
9) The Erichsen flexibility test evaluates the flexibility of a coating by means of a slow deformation. By means of a slow drawing of a cup from a flat sheet an indication is obtained on how the coating will perform during forming operations in practice.
The judgement is as follows:
   1) very bad=total delamination
   2) bad=delamination till the top
   3) moderate=half of the drawing cup is delaminated
   4) good=slight delamination only on the edges max. 2 mm
   5) very good=no coating defects.
10) The DSM cup flexibility evaluates the ability of the coating to withstand stamping operations that form a coated flat panel into a DSMR cup. The judgement of the visual inspection on coating defects is as follows:

1=very bad
2=bad
3=moderate
4=good
5=very good

EXAMPLE II

Coil Coating

The paint according to Example I was applied to zinc-plated steel (Galfan) as a primer using a 30 μm wire coater.

After curing in an oven in a drying cycle of 33 seconds at 358° C. (which yields results comparable with those of coil roll application at 100 m/minute), resulting in a peak metal temperature (PMT) of 210° C., the following properties were determined:
   resistance to solvents: 8 dR
   gloss at 20° 10, gloss at 600: 45
   layer thickness: 5–7μ
   adhesion in cross-cut tape test: GTO
   appearance: good
   flow: good
   T-bend flexibility: 2.5 T After a curing cycle of 42 seconds at 358° C., resulting in a PMT of 232° C., a top coat based on a polyester (Uralac SN841™; DSM Resins) applied onto the above primer showed the following properties:
   resistance to solvents: 100 dR
   gloss at 200: 5, gloss at 600: 32

This shows that a composition according to the invention results in good coil coating properties.

EXAMPLE III

Paint Composition

The resin according to Experiment I was dissolved in a mixture consisting of Solvesso 150™ and dibasic ester (1:1 weight ratio) until a solids content of 55% was reached. The viscosity was 40 dpa.s at 23° C., measured according to the ball drop method (Noury vander Lande). 76.6 parts by weight of the polyester thus obtained were mixed with 18.4 parts by weight of the high solid polyester resin according to Experiment II and 5 parts by weight of dibasic ester, resulting in a 'mixpolyester' with a Tg of 32° C.

97.5 parts by weight of pigment (Kronos 2310™) and 15 parts by weight of Solvesso 150™ were added to 97.5 parts by weight of the polyester mixture. This mixture was then ground to a pigment paste. During the preparation the paste's temperature did not rise above 70° C. After cooling to room temperature, 18.5 parts by weight of the polyester mixture described above and 14.9 parts of isocyanate crosslinker (Uradur YB147™) were then added. The mixture was subsequently diluted with Solvesso 150™ to a viscosity of 90–110 seconds' flow time, DIN cup 4 at 23° C. (DIN standard 53 211).

EXAMPLE IV

Can Coating

The composition according to Example III was applied to an electrolytic tin plate (ETP) using a 40 μm wire coater. After curing in an oven in a drying cycle of 10 minutes at 180° C. the following properties were determined:

resistance to solvents: 17 dR appearance: good layer thickness: 10 μm

DSM cup flexibility: 5/5 (where 1=poor and 5=good), in which the flexibility of a 'DSM-R standard can' was visually determined after punching and sterilisation (demineralised water of 129° C.)

Erichsen cup flexibility: 5/5 (before/after sterilisation)

Erichsen cup twice drawn flexibility: 5/5 (before/after sterilisation)

tap water sterilisation: 5/5 wedge bend: 97% crackfree adhesion: GTO

EXAMPLE V

Paint Composition

The polyester according to Experiment V was dissolved in a mixture of Solvesso 150™ and butyl glycol (4:1 weight ratio) to a solids content of 60%. The viscosity was 31 dpa.s at 23° C., (measured with a Physica Viscolab LC3). The dissolved resin was still stable (clear solution) after 3 months at room temperature.

63.3 parts by weight of the polyester thus obtained were mixed with 31.5 parts by weight of the high solid polyester resin according to Experiment II and 5.2 parts by weight of Solvesso 150™, resulting in a "mixpolyester" with a glass transition temperature of 18° C. and a 60% solids content.

To 28.1 parts by weight of the polyester resin mixture thus obtained were added 67.4 parts by weight of pigment (Kronos 2160™), 15.6 parts by weight of thinner (Solvesso 150™/butyl glycol 3:1) and 0.4 parts by weight of flow-promoting/dispersing agent (Urad DD2945™ 50% in Solvesso 150™). This mixture was then ground to a pigment paste. During the preparation the pastels temperature did not rise above 70° C. After cooling to room temperature, 75.6 parts by weight of the 60% "mixpolyester", 15.1 parts by weight of crosslinker (Cymel 303™, from Dyno Cytec), 4.9 parts by weight of catalyst (Dynapol BL1203™), 1.03 parts by weight of stabiliser (Tinuvin 292™), 8.4 parts by weight of a flattening agent (Syloid ED 44™), 4.4 parts by weight of catalyst (Nacure 2500™) and 8.4 parts by weight of thinner (Solvesso 150™/butyl glycol 3:1) were added.

EXAMPLE VI

Coating Composition

The composition according to Example V was applied as a top coat onto a coil primer on aluminium using an 80 μm wire coater. After curing in an oven in a drying cycle of 41 seconds at 300° C. (which yields results comparable with those of coil roll application at 100 m/minute), resulting in a peak metal temperature (PMT) of 241° C., the following properties were determined:

resistance to solvents: 100 dR gloss at 20°: 17, gloss at 600:59 layer thickness: 19μ appearance: good flow: good

T-bend flexibility: 1T

EXAMPLE VII

Overprint Varnish

The polyester according to Experiment III was dissolved in a mixture consisting of Solvesso 150™ and butyl glycol (4:1 weight ratio) to a solids content of 50%. The viscosity was 35 dpa.s at 23° C., (measured with the aid of a Physica Viscolab LC3). The polyester was still completely dissolved (clear solution) after 3 months at room temperature.

68.4 parts by weight of this polyester were mixed with 22.6 parts by weight of the high solid polyester resin according to Experiment III and 9 parts by weight of a mixture of Solvesso 150™ and butyl glycol (4:1 weight ratio), resulting in a 'mixpolyester' with a glass transition temperature of 24° C. and a 50% solids content.

To 60.9 parts by weight of the polyester resin thus obtained 8.4 parts by weight of crosslinker (Uramex BF891™), 5.0 parts by weight of crosslinker (75% Epikote 834™ in butyl glycol acetate) and 18.5 parts by weight of thinner (Solvesso 150™/isophoron 1:1) were added.

EXAMPLE VIII

Can Coating

The composition according to Example VII was applied to electrolytic tin plate (ETP) as a transparant unpigmented overprint varnish using a 50 μm wire coater. After curing in an oven in a drying cycle of 12 minutes at 185° C. the following properties were determined:

resistance to solvents: 5 dR flexibility: DSM cup 5/4 good appearance: good flow: good tap water sterilisation: 5/4.5.

What is claimed is:

1. A coating resin comprising a mixture of at least two polyesters and a solvent wherein at least one polyester has a glass transition temperature greater than 45° C. and at least one polyester has a Tg of less than 40° C., and wherein the polyesters are soluble in organic solvents, said polyesters are formed from reaction components consisting of an acid component and at least one polyalcohol component, wherein said acid component is selected from the group consisting of phthalic anhydride, isophthalic acid, terephthalic acid, dimethylterephthalate ester, adipic acid, sebacic acid, hexahydroterephthalic acid, decane dicarboxylic acid, 5,6-butylisophthalic acid, tetrahydrophthalic anhydride, succinic anhydride, maleic anhydride, trimellitic anhydride, pyromellitic anhydride, hexahydrophthalic anhydride, and mixtures thereof.

2. A coating resin system according to claim 1, wherein the polyester with the glass transition temperature greater than 45° C. is an amorphous polyester.

3. A can or coil coating composition comprising a coating resin system according to claim 1, a crosslinker and optionally at least one additive.

4. A composition according to claim 3, wherein the crosslinker is a compound containing epoxy groups, a compound containing amino groups or a compound containing isocyanate groups.

5. A substrate that is at least partially coated wherein the coating is obtained from a composition according to claim 3.

6. A coating resin as claimed in claim 1, wherein said acid component is selected from the group consisting of phthalic anhydride, isophthalic acid, terephthalic acid, adipic acid and mixtures thereof.

7. The coating resin according to claim 1, which comprises said at least one polyester having a Tg of less than 40° C. in an amount of at least 50 wt. %.

8. The coating resin composition according to claim 7, wherein the said at least one polyester having a Tg of less than 40° C., has a Tg of less than 10° C.

* * * * *